July 13, 1954          H. O. FADDEN          2,683,298

CORE FOR FORMING CONCRETE ARTICLES

Filed March 23, 1949          4 Sheets-Sheet 1

INVENTOR.

Howard O. Fadden

BY Bean, Brooks, Buckley & Bean.
ATTORNEYS.

July 13, 1954    H. O. FADDEN    2,683,298
CORE FOR FORMING CONCRETE ARTICLES
Filed March 23, 1949    4 Sheets-Sheet 2

INVENTOR.
Howard O. Fadden
BY Bean, Brooks, Buckley & Bean.
ATTORNEYS.

INVENTOR.
Howard O. Fadden
BY Bean, Brooks, Buckley & Bean.
ATTORNEYS.

July 13, 1954  H. O. FADDEN  2,683,298
CORE FOR FORMING CONCRETE ARTICLES
Filed March 23, 1949  4 Sheets-Sheet 4

INVENTOR.
Howard O. Fadden
BY Bean, Brooks, Buckley & Bean
ATTORNEYS.

Patented July 13, 1954

2,683,298

UNITED STATES PATENT OFFICE 2,683,298

CORE FOR FORMING CONCRETE ARTICLES

Howard O. Fadden, Niagara Falls, N. Y.

Application March 23, 1949, Serial No. 82,971

9 Claims. (Cl. 25—128)

My invention relates in general to the molding of concrete articles, and in particular to the molding of an article having walled portions forming passageways. The invention is applicable to various types of molded articles, but for convenience of illustration, I have shown and described the invention as applied to a concrete septic tank and a mold for making the same.

It is well known to those skilled in the art that a septic tank must be provided with not only an inlet and outlet opening, but there must be walled passageways extending from such openings downwardly into the tank for a considerable distance. It is present practice to mold the walled passageway members separately from the tank and to insert and cement them into previously formed recesses provided for them in the upper edge of the tank wall. This not only increases the cost of the finished septic tank, but creates joints which are not desirable.

The principal object of my invention is to provide a septic tank having the walled inlet and outlet passageway members molded integrally with the tank walls thus forming a monolithic structure.

Another object is to provide a mold for forming such an article.

Furthermore, my mold is provided with a core which is made up of a number of separable pieces whereby the core may be conveniently removed from the finished molded product in a step-by-step manner.

Moreover, my mold is of such a design that it can be used over a long period of time without the need of repair.

Furthermore, it is an object of my invention to provide a mold having a core made of two separate semi-cylindrical portions which are collapsible to such a degree as to be easily withdrawn when being removed from the mold.

Moreover, the core portion of my mold is formed with core members for forming the passageways in the finished product, each being provided with a projecting lug for easy removal of the core member from the finished product.

The above objects and advantages have been accomplished by the device shown in the accompanying drawings, of which:

Figure 1:
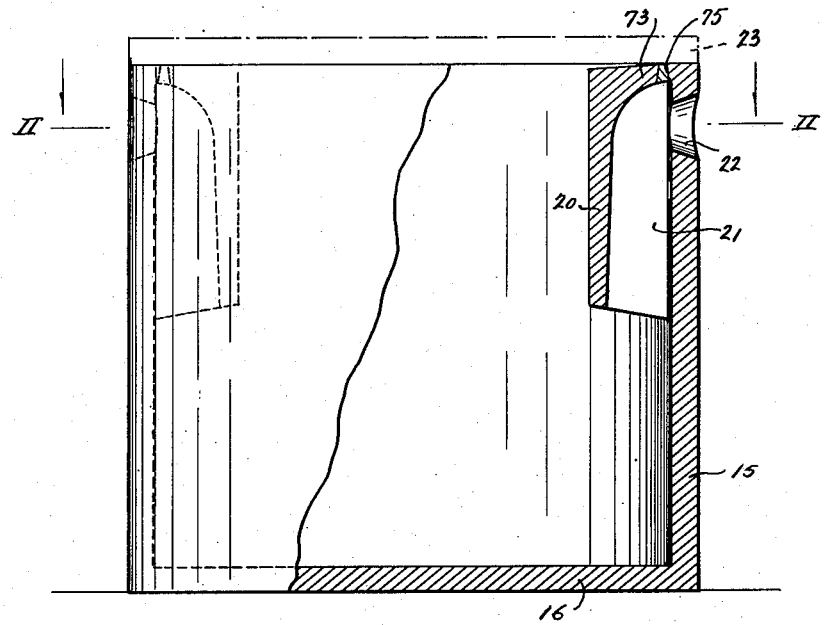
Fig. 1 is an elevation, partly in section, of my invention as manufactured by my method.
Figure 2:
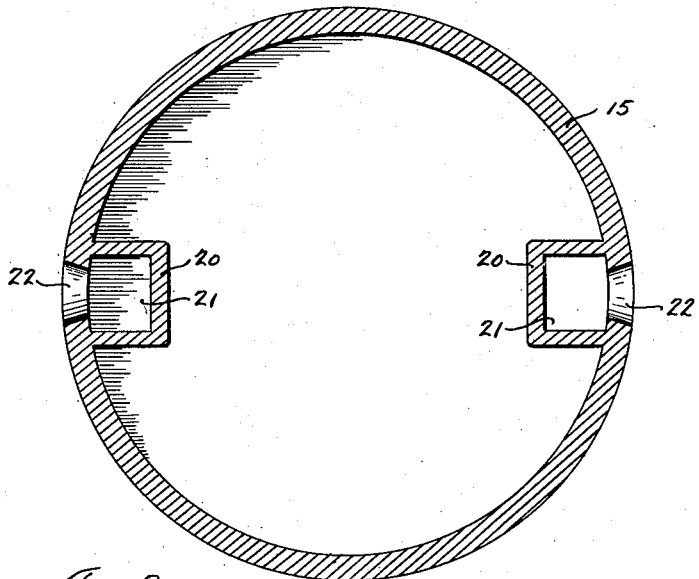
Fig. 2 is a sectional plan view of the tank taken on line II—II of Fig. 1.

As hereinbefore stated, my invention relates to the manufacture of monolithic concrete products, and in Figs. 1 and 2, for purposes of illustration, I have shown a concrete septic tank which embodies my invention.

As shown in these figures the tank comprises an outer wall 15, preferably annular in cross section, and an integrally molded bottom 16. An inner wall 20 is integrally formed at each of two diametrically opposite sides of the tank each of which is spaced from the outer wall of the tank forming a passageway 21. Each of these walls extends downwardly into the tank a considerable distance so that the lower end of the passageway projects into the tank some distance below the upper edge of the tank. The upper end of each passageway terminates in an opening 22. Each septic tank is of course provided with a top cover 23 which may be cemented in place and which is indicated in Fig. 1 by the dot and dash line. From the foregoing, it will be obvious that since the inner walls 20 are integrally molded as a unit with the outer wall 15 of the septic tank, all cemented joints are obviated.

Figure 3:
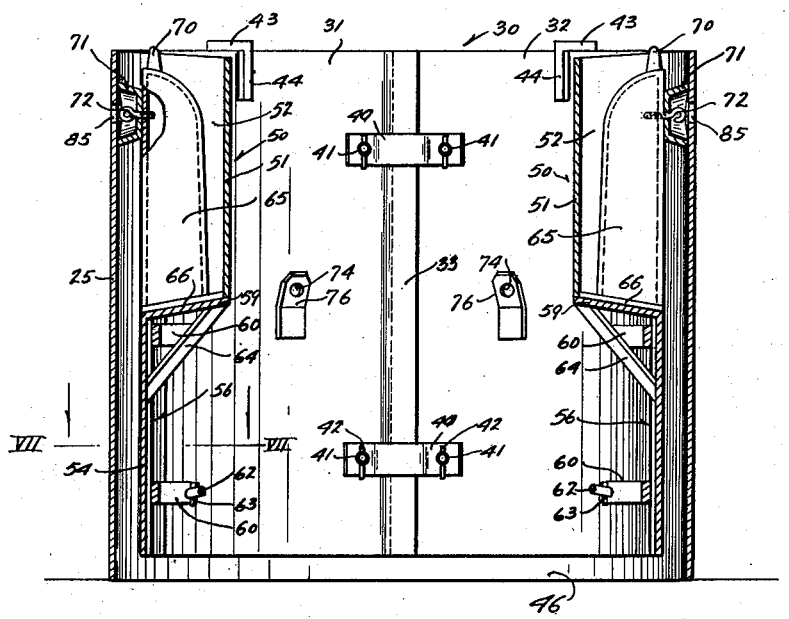
Fig. 3 is an assembled view of my complete mold ready to receive the concrete.
Figure 4:
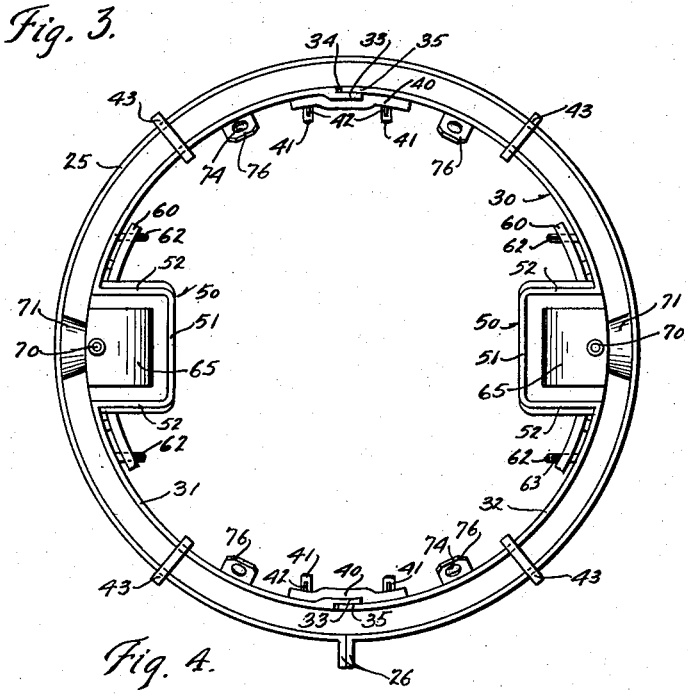
Fig. 4 is a plan view thereof.

In molding the product just above described, I provide a mold shown assembled in Figs. 3 and 4. This mold comprises an outer shell 25 made circular in form for the molding of the product shown in Figs. 1 and 2. This mold is preferably of one continuous piece of sheet metal which is provided at its vertically disposed ends with lugs 26 which are secured together in any suitable manner. A core 30 for the mold is enclosed within the outer shell 25 thereof. The core is formed with two semi-cylindrical sections 31 and 32. The core section 31 is formed at each of its vertical edges with an overlapping portion 33 which is offset in relation to the body of the portion, whereby a recess 34 is provided for the reception of the vertical edge 35 of the opposite core section. When in assembled position these core sections are held in place by means of a number of core straps 40 disposed across each of the vertical joints and held in place by attaching pins 41 through each of which is passed a tapered key 42. The pins 41 are preferably arranged to have their axes parallel so that when the core is to be removed the straps may be easily withdrawn from the pins after removing the keys. Each of the semi-cylindrical core sections is provided with two supporting lugs 43 shaped so that when the core sections are fastened together in cylindrical form, the lugs will overlap the space between the outer shell 25 and the core sections 31 and 32 and serve to support the core within the outer shell. Each of these lugs is provided with a downwardly extending arm 44 which is secured to the inner walls of the core sections by any suitable means. The core 30 is shorter than the outer shell 35 to provide a space 46 for forming the bottom 16 of the tank.

Figure 5:
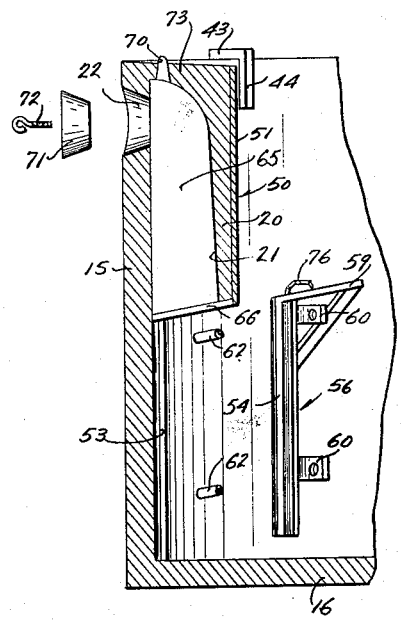
Figs. 5 and 6 show fragmentary sectional views illustrating the removal of the various parts of the core of the mold.
Figure 6:
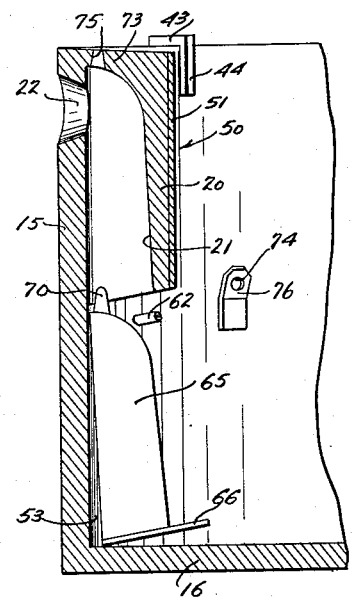
Figure 7:
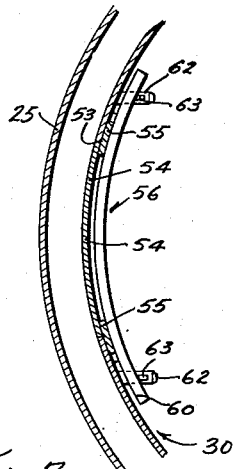
Fig. 7 is an enlarged fragmentary sectional view taken on line VII—VII of Fig. 3.
Figure 8:
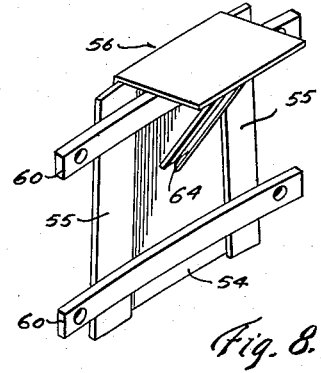
Fig. 8 is an isometrical view of one of the core parts of the mold.
Figure 9:
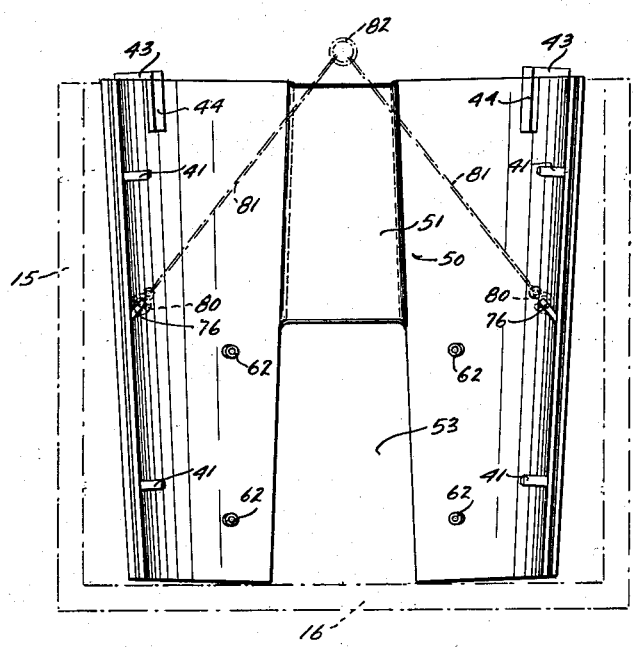
Fig. 9 is an elevational view of one of the semi-cylindrical sections of the mold core showing it contracted and in position for removal of the molded product.

Each of the semi-cylindrical sections of the core is provided along its central portion with an inset wall portion 50 having an inner wall 51 and two side walls 52 serving to join the inner wall with the outer walls of the core section. As shown in Figs. 4 and 9, the side walls 52 are preferably tapered slightly in a downward direction so as to provide sufficient draft for this portion of the core when being withdrawn from the finished tank. Each of these inset wall portions extends downwardly into the core a distance equal substantially to the length of the inner wall 20 of the finished product. Each core section is formed below the points of union of the side walls 52 therewith with an open space 53 which extends from the lower ends of the side walls 52 to the bottom edge of the core section. A core insert 56 is provided for each of the core sections 31 and 32, and each is formed with a peripheral plate 54 which conforms to the contour of the adjacent semi-cylindrical section and which fits into the opening 53, thus serving to close the same and to form a continuation of this outer boundary of the core sections. Each of these plates has a sealing member 55 extending along each of its vertical edges and projecting beyond the edge for contact with the inner surface of the core section, thus effectively sealing the joints between the plate and the core. Each core insert 56 is held in position by means of a number of attaching bars 60 which straddle the opening 53 and which are carried by the sealing members. The bars are provided with suitable apertures 61 for engagement with fastening pins 62 carried by the core sections and which are held in place thereon by means of tapered keys 63 engaging the pins. The core insert 56 is formed at its upper end with a shelf member 59 which extends inwardly from the upper edge of the plate 54 and terminates at the lower edge of the inner wall 51 of the inset wall portion, as clearly shown in Fig. 3. A suitable brace 64, extending from the plate to the shelf member, serves to reinforce this member. The shelf member is preferably inclined with respect to a horizontal plane, as shown in Figs. 3 and 5, so as to provide draft for the core insert when removing the same from the finished tank. The lower edge surfaces of the side walls 52 of the inset wall portion are inclined to correspond to the inclination of the shelf member. So as to facilitate withdrawal of the core insert, the attaching pins 62 have their axes inclined at substantially the same angle as the shelf member, as clearly shown in Figs. 5 and 6.

In order to form the passageway 21 in the finished product when being molded, I provide a passageway core member 65 which is of the shape of the desired passageway having its side walls slightly inclined outwardly in a downward direction so as to provide adequate draft for easy removal of this part. The inner wall is curved outwardly at its upper end, as clearly shown in the drawings so as to provide the desired curvature of the passageway of the finished product. A core plate 66 is secured to the bottom of the passageway core member and is arranged at substantially the same inclination as the lower edges of the side walls 52 of the core portions and as that of the shelf member 59 of the core insert. When assembled, the passageway core member is supported by the shelf member. The upper end of the passageway core member is located some distance below the plane of the upper edges of the side walls 52 of each inset wall portion, as clearly shown in Fig. 3, whereby space is provided for molding the top wall portion 73 of the tank. A knockout pin 70 is provided on the upper end of each passageway core member, and this pin is so proportioned that when the tank is molded the pin will project slightly above the upper surface of the top wall portion 73, as clearly shown in Fig. 5 so that it will be accessible for striking with a hammer when it is desired to remove the core member from the finished tank.

So as to form the openings 22 in the finished article, I provide opening core members 71 each of which is in the form of a cup, as clearly shown in Fig. 3, and which is held in its proper position during the molding process by means of a bolt 72 which passes through the inner wall of this core member and into the passageway core member 65.

Arranged at opposite sides of each of the core sections 31 and 32, is a lifting lug 76, each of which is suitably secured to the inner face of the core section and is formed with an aperture 74 whereby the hook of a hoisting chain (shown by the dot and dash lines in Fig. 9) may be attached thereto when the core 30 is to be removed from the finished molded product.

Figure 10:
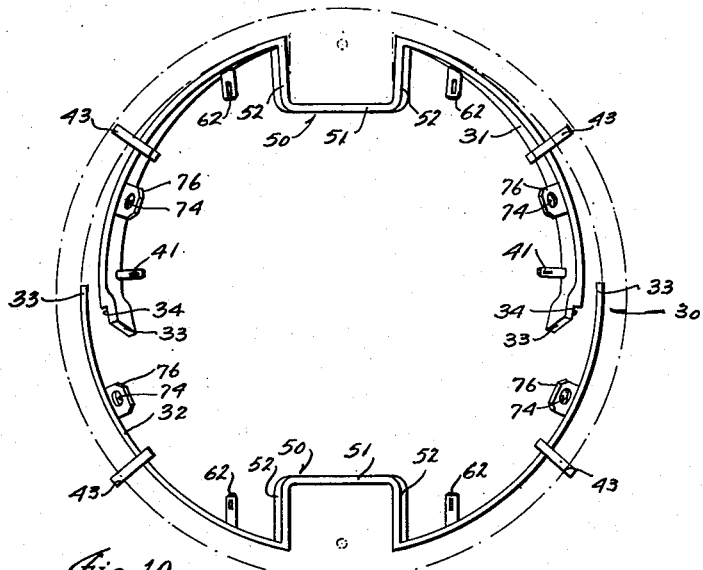
Fig. 10 is a plan view showing one of the semi-cylindrical core sections in position against the inner wall of the finished product, and the other core portion collapsed and ready to be removed from the product.

When the article shown in Figs. 1 and 2 is to be formed by means of my mold, the parts of the mold are assembled, as clearly shown in Figs. 3 and 4, and concrete is first poured into the mold to form the bottom 16. After the concrete forming the bottom has partially hardened, concrete is poured into the mold between the outer shell and the core, which unites with the concrete bottom 16 of the tank. The concrete will fill all of the space between the core and outer shell, and those around the passageway core members and opening core members thus making a single unitary structure. After the concrete has set sufficiently, the core is first removed from the finished product while the outer casing remains in place to support and protect the partially cured molded article. In withdrawing the core, the parts thereof are progressively disassembled and removed. The bolts 72 are first removed through registering openings 85 formed in the outer casing, thereby disconnecting the opening core member 71 from the passageway core member 65. The core inserts 56 are then detached by removing the tapered keys 63 from the fastening pins 62, whereupon these core members may be withdrawn from beneath the plates 66 of the core members 65 and removed from the interior of the mold. After the removal of each of the inserts 56, each passageway core member 65 is removed from the molded product by striking the knockout pin 70 which causes this member to be freed from the surfaces of the molded product, and which due to the draft will then readily drop to the position shown in Fig. 6. The opening 75 formed by the pin 70 in the upper wall 73 of the finished product is subsequently filled with suitable cement, as clearly shown in Fig. 1. After the core parts above mentioned have been removed, the tapered keys 42 holding the core straps 40 are removed, and the core straps are pulled off of the fastening pins 41. Hooks 80 carried by cables or chains 81 and extending to a central ring 82 (all shown in dot and dash lines in Fig. 9) are engaged with the apertures 74 of the lifting lugs of one of the core sections, and then with the lugs of the other core section. Due to the provision of the opening 53 and to the inset wall portion 50, there will be considerable resiliency in each of the core sections. The lifting lugs are so positioned that when the core is elevated by a suitable hoist (not shown) attached to the ring 82, the sides of the core section will be flexed toward each other thereby reducing the circumferential dimension of the core portion and moving it away from the interior wall of the finished product, as clearly shown in Fig. 10. Due to the fact that the inset wall portion 50 permits less flexibility at the upper end of the core section than at the lower portion thereof where the opening 53 is formed, the core section will assume a tapered formation, as clearly shown in Fig. 9, thereby permitting it to be easily withdrawn from the finished product. As clearly shown in Fig. 10, the side walls 52 are flexed away from each other at the edges adjacent the side walls of the product, thereby releasing this part of the core portion from the inner wall 20 of the product. After one section of the core has been removed, the hoisting members 81 are attached to the lifting lugs of the other section which will thereby be contracted, as above set forth, and may then be removed from the finished product. After all of the core parts have been removed from the interior of the finished product, the outer casing 25 is then removed which will expose the opening core members 71 which may then be removed from the finished product.

Obviously, while I have shown and described a specific type of fastening means for holding the attaching bars and core straps in position, other forms of fastening means may be provided. These and other modifications of the details herein shown and described may be made without departing from the spirit of my invention or the scope of the appended claims.

What I claim is:

1. A core adapted to be used with a mold for forming monolithic concrete products comprising a plurality of core sections made of resilient material, means for temporarily fastening the sections together, at least one of the sections being formed with an inset wall portion forming a channel in the wall of the section opening toward the outside surface thereof, the inset portion extending from the top edge of the wall downwardly to a point substantially midway the length thereof, an opening formed in the wall and extending downwardly from the inset portion to the lower edge of the wall, and lifting means secured to the inside surface of the section on opposite sides of the opening therein, whereby when the section having the opening is raised, the wall portions on each side of the opening may be flexed toward each other for easy withdrawal from the finished product.

2. A core adapted to be used with a mold for forming monolithic concrete products comprising a plurality of core sections made of resilient material, means for temporarily fastening the sections together, at least one of the sections being formed with an inset wall portion forming a channel in the wall of the section opening toward the outside surface thereof, the inset portion extending from the top edge of the wall downwardly to a point substantially midway the length thereof, an opening formed in the wall and extending downwardly from the inset portion to the lower edge of the wall, lifting means secured to the inside surface of the section on opposite sides of the opening therein, and removable unit means for closing the bottom of the inset portion and the opening in the wall.

3. A core adapted to be used with a mold for forming monolithic concrete products comprising a number of separate resilient sections shaped to form the interior wall of the article being molded, at least one of the core sections being formed with an inset wall portion having an inner wall and two spaced side walls connecting said inner wall to the outer wall of the section, the side walls and inner walls forming a vertical channel opening into the outer surface of the core, the channel being open at its top and bottom ends, the outer wall of the section being cut away beneath the inset wall portion, and a removable core insert for closing the space in the wall of the core section and for closing the bottom of the channel.

4. A core adapted to be used with a mold for forming monolithic concrete products comprising a number of separate resilient sections shaped to form the interior wall of the article being molded, at least one of the core sections being formed with an inset wall portion having an inner wall and two spaced side walls connecting the inner wall to the outer wall of the section, the side walls and inner walls forming a vertical channel opening into the outer surface of the core, the channel being open at its top and bottom ends, the outer wall of the section being cut away beneath the inset wall portion to form an opening extending to the lower edge of the wall section, a removable core insert comprising a plate for entrance into the opening of the section, and a shelf member for engagement with the lower edges of the walls of the inset wall portion for closing the bottom of the channel.

5. A core adapted to be used with a mold for forming monolithic concrete products comprising a number of separate resilient sections shaped to form the interior wall of the article being molded, at least one of the core sections being formed with an inset wall portion having an inner wall and two spaced side walls connecting the inner wall to the outer wall of the section, the side walls and inner walls forming a vertical channel opening into the outer surface of the core, the channel being open at its top and bottom ends, the outer wall of the section being cut away beneath the inset wall portion to form an opening extending to the lower edge of the wall section, a removable core insert comprising a plate for entrance into the opening of the section, a shelf member for engagement with the lower edges of the walls of the inset wall portion for closing the bottom of the channel, and a passageway core member mounted within the inset wall portion and supported by the shelf member thereof, the passageway core member being in spaced relation to the walls of the inset portion.

6. A core adapted to be used with a mold for forming monolithic concrete products comprising a plurality of core sections made of resilient material, means for temporarily fastening the sections together, at least one of the sections being formed with an inset wall portion forming a channel in the wall of the section opening toward the outside surface thereof, the insert portion extending from the top edge of the wall downwardly to a point substantially midway the length thereof, an opening formed in the wall and extending downwardly from the inset portion to the lower edge of the wall, lifting means secured to the inside surface of the section on opposite sides of the opening therein, removable unit means for closing the bottom of the inset portion and the opening in the wall, and a passageway core member disposed within the inset portion and in spaced relation with the walls thereof, the core member being supported by the removable means.

7. A core adapted to be used with a mold having an outer shell for forming monolithic concrete products having a top wall portion comprising a plurality of core sections made of resilient material, means for temporarily fastening the sections together, at least one of the sections being formed with an inset wall portion forming a channel in the wall of the section opening toward the outside surface thereof, the channel being open at its top and bottom ends, the inset portion extending from the top edge of the wall downwardly to a point substantially midway the length thereof, an opening formed in the wall and extending downwardly from the inset portion to the lower edge of the wall, a removable passageway core member in spaced relation with the walls of the inset wall portion, a knockout pin extending upwardly from and carried by the passageway core member, the length of the pin being such that it will project through and beyond the top wall portion of the finished product, and a removable unit means for closing the bottom of the inset portion and the opening in the wall.

8. A core adapted to be used with a mold for forming monolithic concrete products comprising a plurality of independent core sections made of resilient material and being substantially semi-cylindrical in contour, the longitudinal edges of the sections being closely fitted together, means for temporarily fastening the sections together in assembled positions, at least one of the sections being formed with an elongated opening extending upwardly from the lower edge of the section to a point substantially midway of the longitudinal length thereof, the opening being disposed substantially midway between the longitudinal edges of the section, and lifting means secured to the inside surface of the section having the opening at points on opposite sides of the opening, whereby when the section is raised it will partially collapse inwardly in substantially semi-conical form to permit easy withdrawal from the mold.

9. A core adapted to be used with a mold for forming monolithic concrete products comprising two independent core sections made of resilient material each being substantially semi-cylindrical in contour, the longitudinal edges of the sections being closely fitted together, means for temporarily fastening the sections together in assembled position, each of the sections being formed with an elongated opening extending upwardly from the lower edge of the section to a point substantially midway of the longitudinal length thereof, the opening being disposed substantially midway between the longitudinal edges of the section, and lifting means secured to the inside surfaces of each section at points on opposite sides of the opening and between the upper end of the opening and the bottom edge of the section, whereby when the section is raised by the lifting means, the walls of the section may be collapsed inwardly in substantially semi-conical shape for easy withdrawal from the finished product.

References Cited in the file of this patent

UNITED STATES PATENTS

| Number | Name | Date |
|---|---|---|
| 249,389 | Nelson | Nov. 8, 1881 |
| 803,023 | Staley | Oct. 31, 1905 |
| 994,643 | Johnson | June 6, 1911 |
| 1,097,234 | Kempf | May 19, 1914 |
| 1,432,290 | Harris | Oct. 17, 1922 |
| 1,463,102 | Stryker | July 24, 1923 |
| 1,579,634 | Bidwell | Apr. 6, 1926 |
| 1,981,018 | Wortley | Nov. 20, 1934 |
| 2,052,126 | Brush | Aug. 25, 1936 |
| 2,344,738 | Seifert | Mar. 21, 1944 |
| 2,461,928 | Schopf | Feb. 15, 1949 |
| 2,485,850 | Sitton | Oct. 25, 1949 |
| 2,492,893 | Schopf | Dec. 27, 1949 |